(12) United States Patent
Luo et al.

(10) Patent No.: US 10,382,176 B2
(45) Date of Patent: Aug. 13, 2019

(54) METHOD AND APPARATUS FOR DETERMINING MULTI-POINT TRANSMISSION RESOURCE

(71) Applicant: Huawei Technologies Co., Ltd., Shenzhen, Guangdong (CN)

(72) Inventors: Zezhou Luo, Shenzhen (CN); Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/914,594

(22) Filed: Mar. 7, 2018

(65) Prior Publication Data

US 2018/0198578 A1 Jul. 12, 2018

Related U.S. Application Data

(63) Continuation of application No. PCT/CN2016/095692, filed on Aug. 17, 2016.

(30) Foreign Application Priority Data

Sep. 9, 2015 (CN) .......................... 2015 1 0570418

(51) Int. Cl.
*H04L 5/00* (2006.01)
*H04W 28/16* (2009.01)
(Continued)

(52) U.S. Cl.
CPC ............ *H04L 5/0035* (2013.01); *H04L 5/001* (2013.01); *H04L 5/0091* (2013.01); *H04W 24/02* (2013.01);
(Continued)

(58) Field of Classification Search
USPC ........................................................ 370/329
See application file for complete search history.

(56) References Cited

U.S. PATENT DOCUMENTS

| | | | |
|---|---|---|---|
| 9,894,668 B2 * | 2/2018 | Park | ........................ H04B 7/024 |
| 2013/0235844 A1 * | 9/2013 | Ge | ........................ H04W 36/00 370/331 |

(Continued)

FOREIGN PATENT DOCUMENTS

| | | |
|---|---|---|
| CN | 103299671 A | 9/2013 |
| CN | 104023401 A | 9/2014 |

(Continued)

OTHER PUBLICATIONS

"3rd Generation Partnership Project; Technical Specification Group Radio Access Network; Study on Small Cell enhancements for E-UTRA and E-UTRAN; Higher layer aspects (Release 12)"; 3GPP TR 36.842 V12.0.0; Dec. 2013; 71 pages.

(Continued)

*Primary Examiner* — Phong La

(57) ABSTRACT

A method for determining a multi-point transmission resource includes: obtaining backhaul statuses of multiple cells participating in multi-point transmission, and determining available backhaul rates of the multiple cells according to the backhaul statuses of the multiple cells; obtaining available access resources of the multiple cells for multi-point transmission; and determining access resources of the multiple cells for multi-point transmission according to a type and a service requirement of multi-point transmission, and the available backhaul rates and the available access resources of the multiple cells for multi-point transmission. The method improves multi-point transmission efficiency.

12 Claims, 2 Drawing Sheets

(51) Int. Cl.
*H04W 28/20* (2009.01)
*H04W 28/22* (2009.01)
*H04W 28/02* (2009.01)
*H04W 24/02* (2009.01)
*H04W 72/04* (2009.01)
*H04W 72/12* (2009.01)

(52) U.S. Cl.
CPC ... *H04W 28/0205* (2013.01); *H04W 28/0247* (2013.01); *H04W 28/16* (2013.01); *H04W 28/20* (2013.01); *H04W 28/22* (2013.01); *H04W 72/0486* (2013.01); *H04W 72/0493* (2013.01); *H04W 72/1252* (2013.01)

(56) References Cited

U.S. PATENT DOCUMENTS

| | | | |
|---|---|---|---|
| 2013/0294288 A1 | 11/2013 | Choi et al. | |
| 2013/0329650 A1 | 12/2013 | Cui et al. | |
| 2014/0071933 A1* | 3/2014 | Lee | H04W 52/367 370/329 |
| 2014/0080501 A1* | 3/2014 | Lee | H04W 72/0453 455/454 |
| 2015/0036628 A1 | 2/2015 | Lou et al. | |
| 2015/0271729 A1* | 9/2015 | Sirotkin | H04W 48/00 370/332 |
| 2016/0036571 A1* | 2/2016 | Park | H04B 7/024 370/330 |
| 2016/0219475 A1* | 7/2016 | Kim | H04L 5/00 |
| 2016/0242193 A1* | 8/2016 | Hong | H04W 76/10 |
| 2017/0019811 A1* | 1/2017 | Parulkar | H04L 47/22 |
| 2017/0048782 A1* | 2/2017 | Choi | H04B 7/0404 |
| 2017/0127306 A1* | 5/2017 | Tan Bergstrom | H04W 24/10 |
| 2017/0237535 A1* | 8/2017 | Park | H04L 5/0035 370/329 |

FOREIGN PATENT DOCUMENTS

| | | |
|---|---|---|
| CN | 104618003 A | 5/2015 |
| EP | 2498530 A1 | 9/2012 |
| GB | 2454872 A | 5/2009 |
| WO | 2014038834 A1 | 3/2014 |

OTHER PUBLICATIONS

3rd Generation Partnership Project; Technical Specification Group Radio Access Network; Coordinated multi-point operation for LTE physical layer aspects (Release 11); 3GPP TR 36.819 V11.2.0 (Sep. 2013); 70 pages.

Qualcomm Incorporated, "Coordinated Scheduling Under Non-Ideal Backhaul," R1-135329, 3GPP TSG-RAN WG1 #75, San Francisco, CA, USA, Nov. 11-15, 2013, 2 pages.

Derrick Wing Kwan Ng, et al, "Resource Allocation for Coordinated Multipoint Networks with Wireless Information and Power Transfer," 2014 IEEE Global Communications Conference, Dec. 1, 2014, 8 pages.

* cited by examiner

METHOD AND APPARATUS FOR DETERMINING MULTI-POINT TRANSMISSION RESOURCE

CROSS-REFERENCE TO RELATED APPLICATIONS

This application is a continuation of International Application No. PCT/CN2016/095692, filed on Aug. 17, 2016, which claims priority to Chinese Patent Application No. 201510570418.0, filed on Sep. 9, 2015. The disclosures of the aforementioned applications are hereby incorporated by reference in their entireties.

TECHNICAL FIELD

The present application relates to the field of communications technologies, and in particular, to a method and an apparatus for determining a multi-point transmission resource.

BACKGROUND

A cell is a basic unit of a conventional cellular network, a user terminal selects a specific cell as a serving cell, and the serving cell is responsible for user management and data transmission. A user terminal at a cell edge is in an environment in which a signal of a serving cell is weak and interference from a neighboring cell is strong. In a conventional technology, a signal of a neighboring cell is considered as an interference signal. An interference coordination or interference cancellation technology is used to weaken the signal of the neighboring cell, so as to improve signal quality of an edge user. In addition, to improve system efficiency and provide a high-speed service, a future cellular network is deployed with miniaturized and intensive base stations. Each cell serves a smaller coverage area with a lower power, and a cell spacing is obviously reduced (a typical value is less than 100 meters). In an intensive deployment network, a neighboring cell interference problem is extremely complex. A boundary between a center and an edge of a cell is more vague, and this means that more user terminals are at the cell edge. In addition, a quantity of neighboring cells is increased, and this means that an edge user is interfered by more neighboring cells.

Different from the conventional technology, in a multi-point transmission technology, a neighboring cell and a serving cell jointly serve an edge user terminal, and the neighboring cell that is conventionally considered as an interference source is converted into a useful data source. This can obviously improve channel quality of the edge user, or the edge user terminal can use multiple cell resources at the same time, so as to increase a throughput of the edge user terminal. Compared with the conventional interference coordination or interference cancellation technology, the multi-point transmission technology has an obvious gain, and can obviously improve edge user performance and obtain good overall network performance. At present, multi-point transmission in a 3GPP (3rd Generation Partnership Project) standard mainly includes two mechanisms: coordinated multi-point (CoMP) and dual connectivity (DC). A common characteristic of the CoMP and the DC is that multiple cells including a serving cell and a neighboring cell jointly serve an edge user terminal.

When multi-point transmission is used in an actual network, a backhaul resource of each adjacent station may limit a capability of the adjacent station to participate in multi-point transmission. For example, in an intensive deployment network, backhaul resources of some cells may be insufficient, and this lowers multi-point transmission efficiency. Therefore, how to determine a resource of each cell for participating in multi-point transmission is a key to improvement of the multi-point transmission efficiency.

SUMMARY

The present disclosure provides a method and an apparatus for determining a multi-point transmission resource, so as to improve multi-point transmission efficiency.

According to a first aspect, the present disclosure discloses a method for determining a multi-point transmission resource, including:

obtaining backhaul statuses of multiple cells participating in multi-point transmission, and determining available backhaul rates of the multiple cells according to the backhaul statuses of the multiple cells, where the multiple cells include a primary cell and at least one secondary cell, a backhaul status of the primary cell includes a backhaul status between a gateway and the primary cell, and a backhaul status of the secondary cell includes a backhaul status between the gateway and the secondary cell or a backhaul status between the primary cell and the secondary cell;

obtaining available access resources of the multiple cells for multi-point transmission; and determining access resources of the multiple cells for multi-point transmission according to a type and a service requirement of multi-point transmission, and the available backhaul rates and the available access resources of the multiple cells for multi-point transmission.

With reference to the first aspect, in a specific implementation, the obtaining backhaul statuses of multiple cells participating in multi-point transmission, and determining available backhaul rates of the multiple cells according to the backhaul statuses of the multiple cells includes:

obtaining a maximum backhaul rate of each cell and backhaul load of each cell; and separately calculating an available backhaul rate of each cell according to the maximum backhaul rate and the backhaul load of the cell.

With reference to the foregoing aspect and implementation, the available access resources of the multiple cells for multi-point transmission include available access bandwidths and available powers.

With reference to the foregoing aspect and implementations, when the type of multi-point transmission is coordinated transmission, the determining access resources of the multiple cells for multi-point transmission according to a service requirement of multi-point transmission, and the available backhaul rates and the available access resources of the multiple cells for multi-point transmission includes:

using a minimum value of the available access bandwidths of the multiple cells as an access bandwidth of the multiple cells for multi-point transmission;

calculating, according to the access bandwidth of the multiple cells for multi-point transmission and an available power of each cell in the multiple cells, a maximum access transmission rate obtained by each cell in the multiple cells when the cell participates in multi-point transmission, and using a minimum value of the maximum access transmission rates of the multiple cells as a maximum access transmission rate of the multiple cells for multi-point transmission;

using a minimum value of the available backhaul rates of the multiple cells as a maximum backhaul rate of the multiple cells;

using a minimum value of a maximum rate required by a multi-point transmission service, the maximum access transmission rate of the multiple cells for multi-point transmission, and the maximum backhaul rate as a coordinated transmission rate; and calculating, according to the coordinated transmission rate and the access bandwidth used for multi-point transmission, an access power of each cell in the multiple cells for participating in multi-point transmission; where the access bandwidth of the multiple cells for multi-point transmission and the access power of each cell for participating in multi-point transmission are the access resources of the multiple cells for multi-point transmission.

With reference to the foregoing aspect and implementations, when the type of multi-point transmission is cooperative transmission, the determining access resources of the multiple cells for multi-point transmission according to a service requirement of multi-point transmission, and the available backhaul rates and the available access resources of the multiple cells for multi-point transmission includes:

calculating, according to an available access bandwidth and an available power of each cell in the multiple cells for participating in multi-point transmission, a maximum access transmission rate obtained by each cell in the multiple cells when the cell participates in multi-point transmission;

using a smaller value of the available backhaul rate and the maximum access transmission rate of each cell in the multiple cells as a cooperative transmission rate of the cell; and determining whether a sum of cooperative transmission rates of the multiple cells satisfies the service requirement of multi-point transmission, and determining an access bandwidth and an access power of each cell according to a determining result and the available access bandwidth and the available power of the cell; where the access bandwidth and the access power of each cell in the multiple cells are the access resources of the multiple cells for participating in multi-point transmission.

With reference to the foregoing aspect and implementations, the determining whether a sum of cooperative transmission rates of the multiple cells satisfies the service requirement of multi-point transmission, and determining an access bandwidth and an access power of each cell according to a determining result and the available access bandwidth and the available power of the cell includes:

if the sum of the cooperative transmission rates of the multiple cells satisfies the service requirement of multi-point transmission, separately determining the access bandwidth and the access power of each cell, so that they are not greater than the available access bandwidth and the available power of the cell, and a sum of rates of the multiple cells for multi-point transmission satisfies the service requirement of multi-point transmission, where a rate of each cell for multi-point transmission is estimated according to the access bandwidth and the access power of the cell; or if the sum of the cooperative transmission rates of the multiple cells cannot satisfy the service requirement of multi-point transmission, using, by each cell, the corresponding available access bandwidth and available power for participating in multi-point transmission as the access bandwidth and the access power of the cell.

According to a second aspect, an apparatus for determining a multi-point transmission resource is disclosed, including:

a rate determining module, configured to obtain backhaul statuses of multiple cells participating in multi-point transmission, and determine available backhaul rates of the multiple cells according to the backhaul statuses of the multiple cells, where the multiple cells include a primary cell and at least one secondary cell, a backhaul status of the primary cell includes a backhaul status between a gateway and the primary cell, and a backhaul status of the secondary cell includes a backhaul status between the gateway and the secondary cell or a backhaul status between the primary cell and the secondary cell;

a resource obtaining module, configured to obtain available access resources of the multiple cells for multi-point transmission; and a processing module, configured to determine access resources of the multiple cells for multi-point transmission according to a type and a service requirement of multi-point transmission, and the available backhaul rates and the available access resources of the multiple cells for multi-point transmission.

With reference to the second aspect, in a specific implementation, the rate determining module is specifically configured to:

obtain a maximum backhaul rate of each cell and backhaul load of each cell; and separately calculate an available backhaul rate of each cell according to the maximum backhaul rate and the backhaul load of the cell.

With reference to the foregoing aspect and implementation, the available access resources of the multiple cells for multi-point transmission include available access bandwidths and available powers.

With reference to the foregoing aspect and implementations, when the type of multi-point transmission is coordinated transmission, the processing module is configured to:

use a minimum value of the available access bandwidths of the multiple cells as an access bandwidth of the multiple cells for multi-point transmission;

calculate, according to the access bandwidth of the multiple cells for multi-point transmission and an available power of each cell in the multiple cells, a maximum access transmission rate obtained by each cell in the multiple cells when the cell participates in multi-point transmission, and use a minimum value of the maximum access transmission rates of the multiple cells as a maximum access transmission rate of the multiple cells for multi-point transmission;

use a minimum value of the available backhaul rates of the multiple cells as a maximum backhaul rate of the multiple cells;

use a minimum value of a maximum rate required by a multi-point transmission service, the maximum access transmission rate of the multiple cells for multi-point transmission, and the maximum backhaul rate as a coordinated transmission rate; and calculate, according to the coordinated transmission rate and the access bandwidth used for multi-point transmission, an access power of each cell in the multiple cells for participating in multi-point transmission; where the access bandwidth of the multiple cells for multi-point transmission and the access power of each cell for participating in multi-point transmission are the access resources of the multiple cells for multi-point transmission.

With reference to the foregoing aspect and implementations, when the type of multi-point transmission is cooperative transmission, the processing module is configured to:

calculate, according to an available access bandwidth and an available power of each cell in the multiple cells for participating in multi-point transmission, a maximum access transmission rate obtained by each cell in the multiple cells when the cell participates in multi-point transmission;

use a smaller value of the available backhaul rate and the maximum access transmission rate of each cell in the multiple cells as a cooperative transmission rate of the cell; and determine whether a sum of cooperative transmission rates of the multiple cells satisfies the service requirement of multi-point transmission, and determine an access bandwidth and an access power of each cell according to a determining result and the available access bandwidth and the available power of the cell; where the access bandwidth and the access power of each cell in the multiple cells are the access resources of the multiple cells for participating in multi-point transmission.

With reference to the foregoing aspect and implementations, the determining whether a sum of cooperative transmission rates of the multiple cells satisfies the service requirement of multi-point transmission, and determining an access bandwidth and an access power of each cell according to a determining result and the available access bandwidth and the available power of the cell includes:

if the sum of the cooperative transmission rates of the multiple cells satisfies the service requirement of multi-point transmission, separately determining the access bandwidth and the access power of each cell, so that they are not greater than the available access bandwidth and the available power of the cell, and a sum of rates of the multiple cells for multi-point transmission satisfies the service requirement of multi-point transmission, where a rate of each cell for multi-point transmission is estimated according to the access bandwidth and the access power of the cell; or if the sum of the cooperative transmission rates of the multiple cells cannot satisfy the service requirement of multi-point transmission, using, by each cell, the corresponding available access bandwidth and available power for participating in multi-point transmission as the access bandwidth and the access power of the cell.

According to the method and the apparatus for determining a multi-point transmission resource provided in the present disclosure, after backhaul statuses and available access resources of multiple cells participating in multi-point transmission are obtained, access resources of the multiple cells for multi-point transmission are determined with reference to a type of multi-point transmission, so as to improve multi-point transmission efficiency.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

To make the advantages of the technical solutions of the present disclosure clearer, the following describes the present disclosure in detail with reference to the accompanying drawings and embodiments.

A wireless communications network usually includes: a wireless access point, a wireless access point controller, and a user terminal; or includes merely the wireless access point and the user terminal. The wireless access point may be a base station, an access point (AP), a transmission point, or the like. The wireless communications network may be a cellular mobile communications network, such as WCDMA (Wideband Code Division Multiple Access) or LTE (Long Term Evolution), may be a wireless local area network (WLAN), a future network, or the like. The following embodiment uses the cellular mobile communications network as an example for description. The wireless access point is used as a base station, and the wireless access point controller is used as a base station controller.

In multi-point transmission, multiple cells jointly serve a specific user terminal or user terminal set. These cells include a serving cell of the user terminal and several neighboring cells. The serving cell is a primary cell for multi-point transmission, and the neighboring cell is a secondary cell for multi-point transmission. As an independent cell access point, an adjacent station needs to make a resource decision between serving a user terminal in a cell of the adjacent station and serving a multi-point transmission user terminal because the multi-point transmission user terminal is usually not a user terminal in the cell of the adjacent station. The serving cell of the user terminal is a register cell of the user terminal. A base station of the serving cell has information about the user terminal and needs to use a radio resource of the cell to provide a service for the user terminal. The secondary cell participating in multi-point transmission is a supplement of the serving cell and uses a part of resources of itself to serve the user terminal. However, a capability of the secondary cell to participate in multi-point transmission is affected by various factors, and the factors mainly include at least one of the following: a load status of the secondary cell itself and a radio resource management policy, a backhaul capability of the secondary cell, or a type of a multi-point transmission technology.

Figure 1:
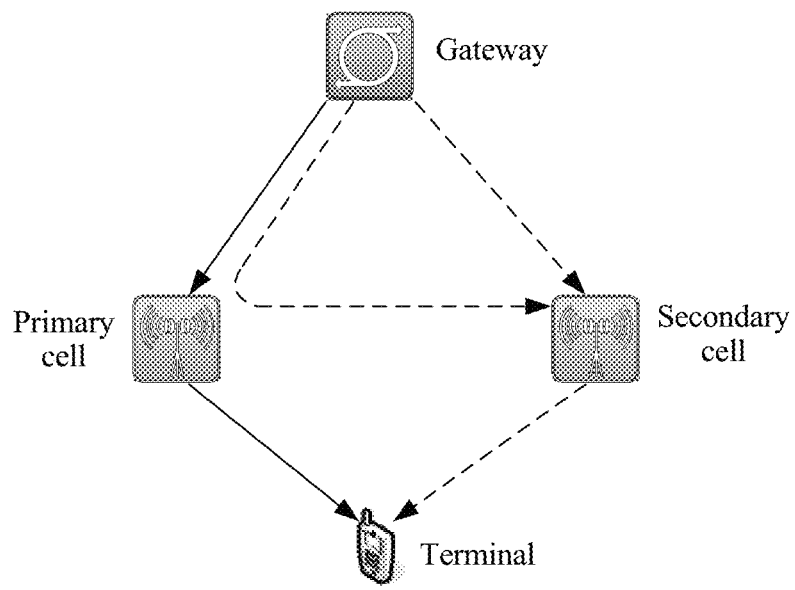
FIG. 1 is a schematic diagram of a multi-point transmission system.

In addition, in multi-point transmission, there are two paths through which the secondary cell obtains user data. As shown in FIG. 1, the user data may be directly sent to the primary cell or the secondary cell by a gateway, and then reaches the terminal; or the user data is sent to the primary cell by a gateway, then is sent to the secondary cell by the primary cell, and finally reaches the terminal. Different data paths are limited by different backhaul capabilities. For the multi-point transmission solution in which the data is directly sent to the primary cell or the secondary cell by the gateway, a backhaul capacity bottleneck lies in a backhaul capability from the gateway to the primary cell or the secondary cell. For the multi-point transmission solution in which the data is forwarded to the secondary cell by the primary cell, a backhaul capacity bottleneck lies in a backhaul capability between the primary cell and the secondary cell (for example, an X2 interface capacity in an LTE system). Therefore, during designing of a multi-point transmission technical solution, three types of backhauls need to be related: a backhaul between the gateway and the primary cell, a backhaul between the gateway and the secondary cell, and a backhaul between the primary cell and the secondary cell.

The following uses a specific embodiment to describe a method for determining a multi-point transmission resource in detail.

Figure 2:
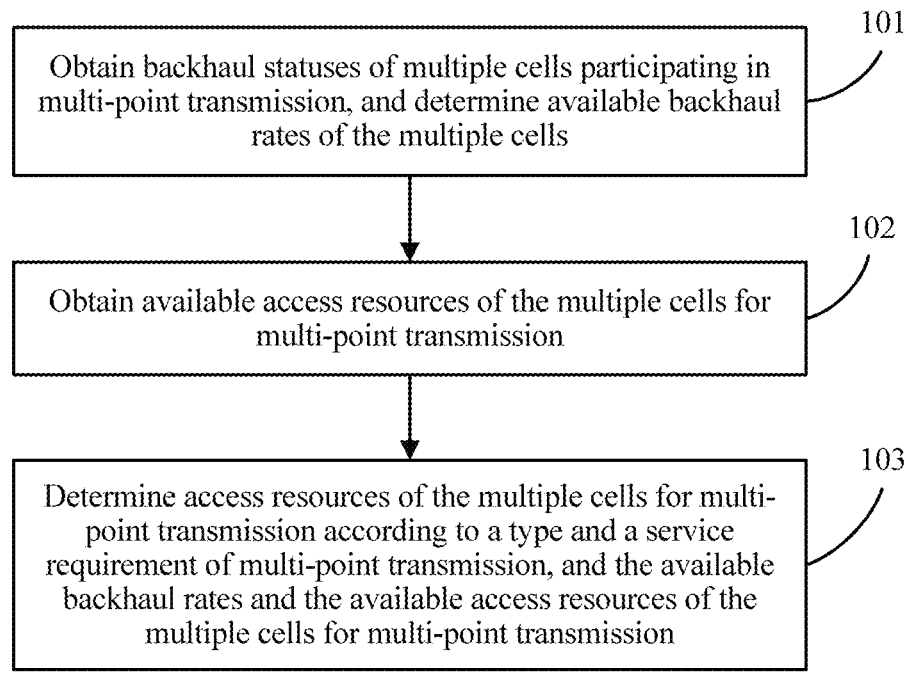
FIG. 2 is a flowchart of a method for determining a multi-point transmission resource according to an embodiment of the present disclosure.

Referring to FIG. 2, the method for determining a multi-point transmission resource mainly includes the following steps.

101. Obtain backhaul statuses of multiple cells participating in multi-point transmission, and determine available backhaul rates of the multiple cells according to the backhaul statuses of the multiple cells, where the multiple cells include a primary cell and at least one secondary cell, a backhaul status of the primary cell includes a backhaul status between a gateway and the primary cell, and a backhaul status of the secondary cell includes a backhaul status between the gateway and the secondary cell or a backhaul status between the primary cell and the secondary cell.

There is only one primary cell, but there may be one or more secondary cells. A backhaul of the primary cell is a backhaul between the gateway and the primary cell, and a backhaul of the secondary cell is a backhaul between the gateway and the secondary cell or a backhaul between the primary cell and the secondary cell. When multi-point transmission is performed, the secondary cell may use any backhaul link to transmit data. For example, a third party network element may determine which backhaul is to be used by the secondary cell. Only one of the backhaul statuses of the secondary cell may be obtained, or both of the backhaul statuses of the secondary cell may be obtained.

In an example, a backhaul status of a cell may be a maximum backhaul rate of the cell and backhaul load of the cell, and the foregoing step 101 specifically includes:

obtaining a maximum backhaul rate of each cell and backhaul load of each cell; and separately calculating an available backhaul rate of each cell according to the maximum backhaul rate and the backhaul load of the cell.

For example, an available backhaul rate of the primary cell is determined according to a maximum backhaul rate between the gateway and the primary cell and backhaul load of the primary cell; an available backhaul rate of the secondary cell is determined according to a maximum backhaul rate between the gateway and the secondary cell and backhaul load of the secondary cell, or is determined according to a maximum backhaul rate between the primary cell and the secondary cell and backhaul load of the secondary cell.

For example, a rate of a currently existing service may be determined according to load information and a maximum rate, and therefore, an available backhaul rate can be obtained by subtracting the rate of the existing service from the maximum backhaul rate.

A backhaul status of each cell is reported to a controller by the cell itself, and the controller is configured to manage capability allocation of a cell participating in multi-point transmission. The controller may be an independent network element or may be a functional entity in a network element. For example, when the controller is located at a base station of the primary cell, each secondary cell reports the backhaul status to the base station of the primary cell. When the controller is located at another network element, such as a base station controller or a mobility management entity (MME), each cell reports the backhaul status to the base station controller or the MME. If the controller is an independent network element, each cell reports the backhaul status to the network element.

102. Obtain available access resources of the multiple cells for multi-point transmission.

The available access resources for multi-point transmission include an available access bandwidth and an available power.

Similar to step 101, an available access bandwidth and an available power of each cell for multi-point transmission may be reported to the controller by the cell itself.

Step 102 may be performed before step 101.

103. Determine access resources of the multiple cells for multi-point transmission according to a type and a service requirement of multi-point transmission, and the available backhaul rates and the available access resources of the multiple cells for multi-point transmission.

A multi-point transmission technology may be classified into two types according to a data transmission manner of each cell in multi-point transmission: coordinated transmission and cooperative transmission. For the coordinated transmission, the primary cell and the secondary cell send or receive same data at the same time, so as to form a transmit diversity or a receive diversity to improve signal transmission quality, and further improve transmission performance. For the cooperative transmission, the primary cell and the secondary cell separately send or receive a part of data, and a sum of data transmitted by all the cells participating in multi-point transmission constitutes complete data. Therefore, a user terminal is allowed to occupy resources of multiple cells, so as to increase a quantity of available resources of the user terminal, and improve transmission performance. CoMP defined by 3GPP has the foregoing coordinated transmission manner such as joint transmission, and the cooperative transmission manner such as dynamic cell selection.

An interrelationship between cells in the coordinated transmission is quite different from that in the cooperative transmission. In the coordinated transmission, transmission of all cells is strongly related, and there is a relatively high requirement for timing synchronization, resource scheduling synchronization, and the like. A coordinated transmission technology is the joint transmission in the CoMP defined by 3GPP. In the cooperative transmission, after data amount allocation of each cell is performed, specific scheduling and transmission are completed in a relatively independent way. A channel between each cell and a terminal is also independently maintained by themselves, and therefore, the cooperative transmission has a relatively low requirement for synchronization. A cooperative transmission technology is the dynamic cell selection in the CoMP defined by 3GPP, and another cooperative transmission technology is dual connectivity. In this embodiment, types of the coordinated transmission and the cooperative transmission are not limited to the foregoing types.

Regardless of the coordinated transmission or the cooperative transmission, before actual transmission is performed, an available resource (such as a power and a bandwidth) of each cell for participating in multi-point transmission needs to be determined. It should be noted that the available resource assignment is a resource quantity, of a large time granularity, that is determined before actual transmission is performed. That is, a power nominal value and a bandwidth nominal value that a specific cell uses to serve a specific multi-point transmission user are regulated.

In addition to the type of multi-point transmission, the service requirement of multi-point transmission needs to be considered. That is, it is determined that the access resources of the multiple cells for multi-point transmission need to satisfy the service requirement of multi-point transmission. Certainly, if the service requirement is relatively low, it may be ignored, and the access resources of the multiple cells for multi-point transmission are determined only according to the type of multi-point transmission, and the available backhaul rates and the available access resources of the multiple cells for multi-point transmission.

Optionally, the method may further include: assigning access resources used for multi-point transmission to the multiple cells.

For example, after calculating the access resources (the powers and the bandwidths) of the multiple cells for multi-point transmission, the controller assigns the access resource to each cell (including the primary cell and the secondary cell), so that the multiple cells use the access resources to perform multi-point transmission.

It is assumed that in step 101, the available backhaul rate of each cell is obtained by means of calculation, and in step 102, an available access bandwidth and an available power of each cell for multi-point transmission are obtained. The following further describes a specific process of step 103 from two types: coordinated transmission and cooperative transmission.

1. A characteristic of coordinated transmission is that the primary cell and the secondary cell send or receive same data at a same time. Therefore, each cell uses a same access bandwidth and rate to perform multi-point transmission, but an access power of each cell for multi-point transmission may be different. When a multi-point transmission manner is coordinated transmission, step 103 includes:

1.1. Use a minimum value of the available access bandwidths of the multiple cells for multi-point transmission as an access bandwidth of the multiple cells for multi-point transmission.

The available access bandwidth of each cell for multi-point transmission may be different. Therefore, the minimum value is selected as a common access bandwidth, and each cell uses the minimum value as the access bandwidth used for multi-point transmission.

1.2. Calculate, according to the access bandwidth of the multiple cells for multi-point transmission that is obtained in step 1.1 and an available power of each cell in the multiple cells, a maximum access transmission rate obtained by each cell in the multiple cells when the cell participates in multi-point transmission, and use a minimum value of the obtained maximum access transmission rates of the multiple cells as a maximum access transmission rate uniformly used by all the cells.

The access bandwidth of each cell for multi-point transmission is uniform, but the available power of each cell may be different. Therefore, the maximum access transmission rate obtained by each cell when the cell participates in multi-point transmission needs to be separately calculated. An existing algorithm may be used for calculation.

The minimum value of the maximum access transmission rates of the multiple cells is the maximum access transmission rate uniformly used by the multiple cells for multi-point transmission.

1.3. Use a minimum value of the available backhaul rates of the multiple cells as a maximum backhaul rate of the multiple cells.

The available backhaul rate of each cell for multi-point transmission may be different. Therefore, the minimum value is selected, and each cell uses the minimum value as the maximum backhaul rate used for multi-point transmission.

1.4. Use a minimum value of a maximum rate required by a multi-point transmission service, the maximum access transmission rate of the multiple cells for multi-point transmission, and the maximum backhaul rate as a coordinated transmission rate.

The service requirement of multi-point transmission needs to be satisfied, and therefore, the maximum rate required by the multi-point transmission service needs to be learned. In addition, the maximum access transmission rate obtained by all the cells when participating in multi-point transmission is obtained in step 1.2, and the maximum backhaul rate is obtained in step 1.3. The minimum value is selected from the three rates as the coordinated transmission rate of all the cells, and each cell uses the coordinated transmission rate. In one of specific embodiments, the maximum rate required by the multi-point transmission service is a sum of rates required by multi-point transmission user terminals.

If the factor of the service requirement of multi-point transmission is not considered, a smaller value is selected from the maximum access transmission rate, obtained in step 1.2, obtained by all the cells when participating in multi-point transmission and the maximum backhaul rate obtained in step 1.3 as the coordinated transmission rate of all the cells.

1.5. Calculate, according to the coordinated transmission rate and the access bandwidth used for multi-point transmission, an access power of each cell in the multiple cells for participating in multi-point transmission.

The coordinated transmission rate of all the cells is obtained in step 1.4. Then, with reference to the access bandwidth used for multi-point transmission in step 1.1, the access power of each cell for participating in multi-point transmission can be calculated. For a specific calculation manner, refer to Shannon's equation. The access power of each cell for participating in multi-point transmission may be different.

The access bandwidth of the multiple cells for multi-point transmission and the access power of each cell for participating in multi-point transmission are the access resources of the multiple cells for multi-point transmission.

2. For cooperative transmission, the primary cell and the secondary cell separately send or receive a part of data, and a sum of data transmitted by all the cells participating in multi-point transmission constitutes complete data. Therefore, an access bandwidth and an access power of each cell that satisfy a cooperative transmission rate of the cell may be different. When the multi-point transmission manner is cooperative transmission, the step 103 includes:

2.1. Calculate, according to an available access bandwidth and an available power of each cell in the multiple cells for participating in multi-point transmission, a maximum access transmission rate obtained by each cell in the multiple cells when the cell participates in multi-point transmission.

The available access bandwidth and the available power of each cell may be different. Therefore, the maximum access transmission rate obtained by each cell when the cell participates in multi-point transmission needs to be separately calculated. A calculation process may be implemented by using an existing algorithm.

2.2. Use a smaller value of the available backhaul rate and the maximum access transmission rate of each cell in the multiple cells as a cooperative transmission rate of the cell.

Each cell performs the foregoing steps, and a cooperative transmission rate of each cell is separately obtained. In the cooperative transmission, the cooperative transmission rate of each cell may be different.

2.3. Determine whether a sum of cooperative transmission rates of the multiple cells satisfies the service requirement of multi-point transmission, and determine an access bandwidth and an access power of each cell according to a determining result and the available access bandwidth and the available power of the cell.

If the sum of the cooperative transmission rates of the multiple cells satisfies the service requirement of multi-point transmission, for example, if the sum of the cooperative transmission rates of the multiple cells is greater than or equal to a rate required by the multi-point transmission service, the access bandwidth and the access power of each cell are separately determined, so that they are not greater than the available access bandwidth and the available power of the cell, and a sum of rates of the multiple cells for multi-point transmission satisfies the service requirement of multi-point transmission, for example, the sum of the rates of the multiple cells for multi-point transmission is greater than or equal to the rate required by the multi-point transmission service. A rate of each cell for multi-point transmission is estimated according to the access bandwidth and the access power of the cell, and an estimation process may be performed according to the existing Shannon's equation.

If the sum of the cooperative transmission rates of the multiple cells cannot satisfy the service requirement of multi-point transmission, for example, if the sum of the cooperative transmission rates of the multiple cells is less than or equal to the rate required by the multi-point transmission service, each cell directly uses the available access bandwidth and the available power for participating in multi-point transmission in step 2.1. That is, all available access resources are used as the access bandwidth and the access power of each cell, so as to satisfy the service requirement of multi-point transmission as far as possible.

If the sum of the cooperative transmission rates of the multiple cells is equal to the rate required by the multi-point transmission service, both the foregoing two processing manners are applicable.

Each cell separately performs the foregoing operation to obtain the access bandwidth and the access power. In the cooperative transmission, the access bandwidth and the access power of each cell may be different.

The access bandwidth and the access power of each cell in the multiple cells are the access resources of the multiple cells for participating in multi-point transmission.

The following uses two algorithm embodiments to further describe specific access resource determining processes of the foregoing coordinated transmission manner and cooperative transmission manner, and the two algorithm embodiments are respectively corresponding to steps 1 and 2 of the foregoing embodiment.

1. Determine an access resource of a cell for participating in multi-point transmission in the coordinated transmission.

It is assumed that currently there are N cells participating in coordinated transmission, and a base station of each cell is equipped with multiple antennas. To complete coordinated transmission, one weighting coefficient needs to be calculated for each antenna of each cell. All antennas of all the cells use their own weighting coefficients to weight and send a same signal, and an enhanced wanted signal is formed on a user terminal. In addition, all the antennas of all the cells weight and send signals of other users, so as to minimize interference to the user. One mathematical description of coordinated transmission may be represented by using formula (2):

$$\begin{cases} \min_{P^{JP}, W^{JP}} \left( \sum_{j \in J} | R_j^{achieved} - R_j^{dem} |^2 \right), \\ \text{s.t.} \\ \sum_{j \in J} R_j^{achieved} \leq R_n^{BH}, \forall n \in N, \\ \sum_{j \in J} W_j^{JP} \leq W_{n,ref}^{JP}, \forall n \in N, \\ \sum_{j \in J} P_{j,n}^{JP} \leq P_{n,ref}^{JP}, \forall n \in N, \end{cases} \quad (2)$$

where $P^{JP}$—a to-be-determined power vector of each cell for multi-point transmission; it includes a power $P_{j,n}^{JP}$ of each cell for each multi-point transmission user, where j is a user label and n is a cell label;

$W^{JP}$—a to-be-determined bandwidth of each cell for multi-point transmission;

J—a set of user terminals using multi-point transmission;

N—a set of cells participating in multi-point transmission;

$R_j^{achieved}$—a rate that can be obtained by a user terminal j; it depends on a channel state and a quantity of occupied resources and is calculated by using formula (3):

$$R_j^{achieved} = W_j^{JP} \cdot \log(1 + | r_j^{JP} |^2 / \sigma_0^2). \quad (3)$$

Figure 3:
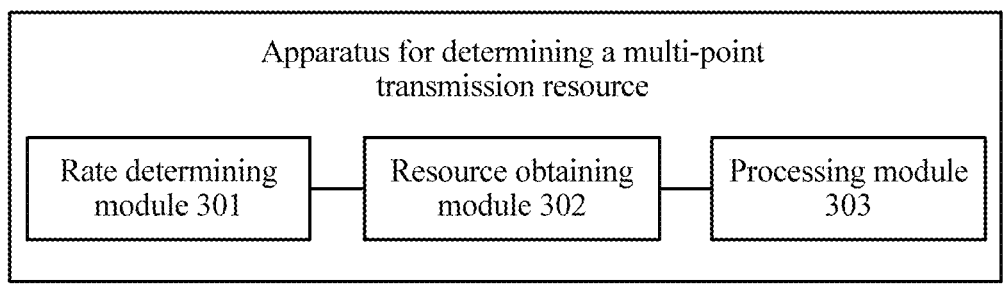
FIG. 3 is a schematic structural diagram of an apparatus for determining a multi-point transmission resource according to an embodiment of the present disclosure.

$R_j^{dem}$—a required rate of the user terminal j;

$R_n^{BH}$—an available capacity of a backhaul between a cell n and a primary cell; the parameter may further represent an available capacity of a backhaul between the cell n and a corresponding gateway, and it depends on a transmission path of user data (refer to FIG. 3);

$W_{n,ref}^{JP}$—a maximum bandwidth of the cell n for multi-point transmission; it is obtained from available resource information that is sent by the cell n for participating in multi-point transmission;

$W_j^{JP}$—a bandwidth of the user j;

$P_{n,ref}^{JP}$—a maximum power of the cell n for multi-point transmission; it is obtained from the available resource information that is sent by the cell n for participating in multi-point transmission;

$P_{j,n}^{JP}$—a power of the cell n used for the user j; and $\sigma_0^2$—a noise power.

$r_j^{JP}$ in formula (3) is a signal received by the user terminal, and is generated after signals transmitted by all antennas of all cells are overlaid and enhanced on the user terminal. In addition, the signal is overlaid and canceled on another user terminal, and no interference is caused to the another user terminal. A receiving signal of the user terminal j may be represented by using formula (4):

$$r_j^{JP} = \sqrt{P_j^{JP}} \cdot h_j^H \cdot w_j \cdot x_j + \sum_{i \neq j} \sqrt{P_i^{JP}} \cdot h_i^H \cdot w_i \cdot x_i + \sigma_0. \quad (4)$$

where $h_j$, $h_i$—a vector formed channels from user terminals j and i to each antenna of each cell;

$w_j$, $w_i$—a vector formed for weighting coefficients of users j and i by each antenna of each cell; and $x_j$, $x_i$—data of the user terminals j and i.

In the receiving signal shown in formula (4), the second item on the right side of the formula is an interference item to the user terminal j from another user terminal. In coordinated transmission, the weighting coefficient vector $w_i$ is designed, so that the item becomes zero, so as to eliminate interference to the user terminal j from the another user.

In the receiving signal shown in formula (4), the first item on the right side of the formula is a wanted signal of the user terminal j, and usually the weighting coefficient vector $w_i$ is designed, so as to have a unit gain after the weighting coefficient vector compensates for a channel $h_j$ that is, when the signal reaches the user terminal through the channel after being weighted, the gain is 1). Then, after a total power $p_j^{JP}$ for the user j is adjusted, a receiving signal $r_j^{JP}$ achieves required strength. A weighting coefficient vector for the user terminal j includes weighting coefficient vectors of all the cells, that is, $w_j=[w_{j,1}{}^T, w_{j,2}{}^T, \ldots, w_{j,N}{}^T]^T$, where $w_{j,n}$ is a weighting coefficient vector used by an $n^{th}$ cell when performing coordinated transmission the user terminal j. The weighting coefficient vector $w_j$ is normalized, that is, $|w_j|=1$. Therefore, as a sub-vector of the weighting coefficient vector $w_j$, $|w_{j,n}|\le 1$. Therefore, a power of the $n^{th}$ cell for the user terminal j is represented by formula (5):

$$P_{j,n}{}^{JP}=P_j{}^{JP}\cdot|w_{j,n}|^2 \quad (5)$$

It may be seen from formula (5) that a power of each cell is proportional. That is, the power of each cell is proportional to a square of a modulus value of a weighting coefficient vector of the cell.

By solving an optimization problem in formula (2), a power assignment $$P_n^{JP} = \sum_{j \in J} P_{j,n}^{JP}$$

and a resource quantity assignment $$W^{JP} = \sum_{j \in J} W_j^{JP}$$

of each cell are obtained, so that a rate obtained during coordinated transmission satisfies a requirement of a single multi-point transmission terminal or requirements of multiple multi-point transmission user terminals as far as possible. It should be noted that, a characteristic of a coordinated transmission technology requires that in actual transmission, all the cells use a same resource quantity (for example, a bandwidth). Therefore, in formula (2), all the cells have a same bandwidth $W^{JP}$, but a power $$P_n^{JP} = \sum_{j \in J} P_{j,n}^{JP}$$

of each cell has a different value according to a weighting coefficient sub-vector and a channel state.

The foregoing content describes an optimization objective of multi-point transmission when a coordinated transmission manner is used. The following specific optimization algorithm is provided to implement the foregoing optimization objective. Corresponding to steps 1.1 to 1.5 in the foregoing method embodiment, method steps for obtaining a solution of the optimization problem in formula (2) are as follows:

(1) Determine an available access bandwidth $$W_{n,ref}^{JP} = \sum_{j \in J} W_{j,n,ref}^{JP}$$

of each cell for multi-point transmission, where $W_{j,n,ref}^{JP}$ is a maximum power budget of a cell n for a user j, and J is a user set. Determine a minimum value $W^{JP}=\min(W_{n,ref}^{JP}, n=1, \ldots, N)$ of the available access bandwidths of all the cells participating in multi-point transmission as an access bandwidth of all the cells for multi-point transmission, that is, a common access bandwidth.

(2) According to the common access bandwidth $W^{JP}$ for multi-point transmission and an available power $$P_{n,ref}^{JP} = \sum_{j \in J} P_{j,n,ref}^{JP}$$

of each cell for multi-point transmission, estimate a maximum access transmission rate obtained by each cell when the cell participates in multi-point transmission:

$$R_{n,max}^{JP,acc} = W_{JP} \cdot \log_2\left(1 + \frac{P_{n,ref}^{JP} \cdot |\bar{h}_n|^2}{\sigma_0^2}\right),$$

where an average channel gain $$\bar{h}_n = \left(\frac{1}{|J|} \sum_{j \in J} |h_{j,n}^H \cdot w_{j,n}|^2\right)^{1/2},$$

$h_{j,n}$ is a channel gain vector from the user terminal j to the cell n, $W_{j,n}$ is an antenna weighting vector of the cell n for the user terminal j, and $|J|$ is a quantity of multi-point transmission user terminals. A minimum value $R_{ref}^{JP,acc}=\min(R_{n,max}^{JP,acc}, n=1, \ldots, N)$ is selected from the maximum access transmission rates of all the cells as a maximum access transmission rate of all the cells for multi-point transmission, and each cell uses the maximum access transmission rate.

(3) Determine a minimum value $R_{ref}^{BH}$ of available backhaul rates of the multiple cells participating in multi-point transmission as a maximum backhaul rate of the multiple cells for multi-point transmission:

$$R_{ref}^{BH}=\min(R_n^{BH}, n=1, \ldots, N).$$

(4) Determine a rate $R^{JP}=\min(R_{ref}^{JP,acc}, R_{ref}^{BH}, R^{dem})$ of all the cells participating in coordinated transmission, that is, use a minimum value of a maximum rate required by a multi-point transmission service, the maximum access transmission rate of the multiple cells for multi-point transmission, and the maximum backhaul rate as a coordinated transmission rate.

In one of specific embodiments, the maximum rate required by the multi-point transmission service is a sum $$R^{dem} = \sum_{j \in J} R_j^{dem}$$

of rates required by multi-point transmission user terminals.

(5) Determine, according to the coordinated transmission rate and the access bandwidth used for multi-point transmission, an access power $$P_n^{JP} = \frac{\sigma_0^2}{|\bar{h}_n|^2} \cdot \left(2^{R^{JP}/W^{JP}} - 1\right)$$

of each cell for participating in multi-point transmission.

Determine, according to the foregoing steps, that access resources ($P_n^{JP}, W^{JP}$) of all the cells for multi-point transmission are the solution of the optimization problem in formula (2).

2. Determine an access resource of a cell for participating in multi-point transmission in the cooperative transmission.

It is assumed that currently there are N cells participating in cooperative transmission, and a base station of each cell is equipped with multiple antennas. To complete cooperative transmission, first, rate allocation is performed for each cell to determine a partial rate that the cell undertakes in jointly serving multi-point transmission users. Then, each cell obtains partial user data according to a determined rate and independently completes data transmission with the users. To determine rate allocation of each cell, information such as cell load (used to determine an available access resource), a cell available backhaul capability, and a state of a channel from a user and a base station of the cell needs to be considered. In cooperative transmission, an optimization problem for determining rate allocation of a cell, so as to determine a resource assignment may be described by using formula (6):

$$\begin{cases} \min_{P^{coop}, W^{coop}} \left( \sum_{j \in J} \left| \sum_{n \in N} R_{j,n}^{achieved} - R_j^{dem} \right|^2 \right), \\ \text{s.t.} \\ \sum_{j \in J} R_{j,n}^{achieved} \leq R_n^{BH}, \forall n \in N, \\ \sum_{j \in J} W_{j,n}^{coop} \leq W_{n,ref}^{coop}, \forall n \in N, \\ \sum_{j \in J} P_{j,n}^{coop} \leq P_{n,ref}^{coop}, \forall n \in N, \end{cases} \quad (6)$$

where $P^{coop}$—a to-be-determined power vector of each cell for multi-point transmission; it includes a power $P_{j,n}^{JP}$ of each cell for each multi-point transmission user, where j is a user label and n is a cell label;

$W^{coop}$—a to-be-determined bandwidth of each cell for multi-point transmission;

J—a set of user terminals using multi-point transmission;

N—a set of cells participating in multi-point transmission;

$R_{j,n}^{achieved}$—a rate that can be obtained by a cell n when serving a user terminal j; it depends on a channel state and a quantity of occupied resources and is calculated by using formula (7):

$$R_{j,n}^{achieved} = W_{j,n}^{coop} \cdot \log(1 + |r_{j,n}^{coop}|^2 / \sigma_0^2). \quad (7)$$

where, $W_{j,n}^{coop}$ is a bandwidth of the cell n used for the user terminal j;

$R_j^{dem}$—a required rate of the user terminal j;

$R_n^{BH}$—an available capacity of a backhaul between the cell n and a primary cell; the parameter may further represent an available capacity of a backhaul between the cell n and a corresponding SGW, and it depends on a transmission path of user data (refer to FIG. 3);

$W_{n,ref}^{coop}$—a maximum bandwidth of the cell n for multi-point transmission; it is obtained from available resource information that is sent by the cell n for participating in multi-point transmission; and $P_{n,ref}^{coop}$—a maximum power of the cell n for multi-point transmission; it is obtained from the available resource information that is sent by the cell n for participating in multi-point transmission.

In cooperative transmission, each cell independently completes data transmission with a user terminal, and therefore, relevance between cells is reflected in rate allocation. Each cell is allocated a rate that is suitable for its available access resource status and an available backhaul capacity, so as to determine a resource assignment used by the cell for participating in multi-point transmission and unite all cells to satisfy requirements of multiple multi-point transmission users. A signal sent by the cell n to the user j may be represented by formula (8):

$$r_{j,n}^{coop} = \sqrt{P_{j,n}^{coop}} \cdot h_{j,n}^H \cdot w_{j,n} \cdot x_j + \sum_{i \neq j} \sqrt{P_{i,n}} \cdot h_{i,n}^H \cdot w_{i,n} \cdot x_i + \sigma_0. \quad (8)$$

where $h_{j,n}$—a vector formed by channels from the user terminal j to each antenna of the cell n;

$w_{j,n}$—a vector formed for a weighting coefficient of the user terminal j by each antenna of the cell n; and $x_j$—data of the user terminal j.

By solving the optimization problem in formula (6), a power assignment and a resource assignment of each cell are obtained, so that a rate obtained during cooperative transmission satisfies a requirement of a single multi-point transmission user terminal or requirements of multiple multi-point transmission user terminals as far as possible. It should be noted that a characteristic of a cooperative transmission technology is that each cell relatively independently serves a same multi-point transmission user terminal, and after an access resource assignment $$P_n^{coop} = \sum_{j \in J} P_{j,n}^{coop} \text{ and } W_n^{coop} = \sum_{j \in J} W_{j,n}^{coop}$$

is obtained by solving the optimization problem in formula (6), all cells independently complete scheduling and transmission according to the assigned resource quantity.

The foregoing content describes an optimization objective of multi-point transmission when a cooperative transmission manner is used. The following specific optimization algorithm is provided to implement the foregoing optimization objective. Corresponding to steps 2.1 to 2.3 in the foregoing method embodiment, method steps for obtaining a solution of the optimization problem in formula (6) are as follows:

(1) Calculate, according to an available access resource (a power $P_{n,ref}^{coop}$ and a bandwidth $W_{n,ref}^{coop}$) of each cell in multiple cells for participating in multi-point transmission, a maximum access transmission rate that can be obtained by the cell when independently serving a multi-point transmission user terminal:

$$R_{n,max}^{coop,acc} = W_{n,ref}^{coop} \cdot \log_2\left(1 + \frac{P_{n,ref}^{coop} \cdot |\bar{h}_n|^2}{\sigma_0^2}\right),$$

where an average channel gain $$\bar{h}_n = \left( \frac{1}{|J|} \sum_{j \in J} |h_{j,n}^H \cdot w_{j,n}|^2 \right)^{1/2},$$

$h_{j,n}$ is a channel gain vector from a user j to a cell n, $w_{j,n}$ is an antenna weighting vector of the cell n for the user j, $|J|$ and is a quantity of multi-point transmission users.

(2) Use a smaller value of the maximum access transmission rate and an available backhaul rate of each cell as a cooperative transmission rate of the cell:

$$R_n^{coop} = \min(R_{n,max}^{coop,acc}, R_n^{BH}).$$

(3) Determine whether a sum of cooperative transmission rates of the multiple cells satisfies a service requirement of multi-point transmission, where if the sum of the cooperative transmission rates of the multiple cells cannot satisfy a requirement of a multi-point transmission user terminal, the available access resource (the power $P_{n,ref}^{coop}$ and the bandwidth $W_{n,ref}^{coop}$) of each cell is an access resource of the cell for participating in multi-point transmission, that is, all available access resources are used: the power $P_n^{coop} = P_{n,ref}^{coop}$ and the bandwidth $W_n^{coop} = W_{n,ref}^{coop}$; or if a sum of cooperative transmission rates of the multiple cells can satisfy a requirement of a multi-point transmission user terminal, a rate $R_{n,det}^{coop}$ is allocated to each cell to satisfy the following formula:

$$\begin{cases} \sum_{n \in N} R_{n,det}^{coop} \geq \sum_{j \in J} R_j^{dem}, \\ R_{n,det}^{coop} \leq R_n^{coop}, \forall n \in N \end{cases}.$$

Determine a subset value (the power $P_n^{coop} \leq P_{n,ref}^{coop}$ and the bandwidth $W_n^{coop} \leq W_{n,ref}^{coop}$) of the available access resource of the cell n according to a rate $R_{n,det}^{coop}$ allocated to the cell n, where the access resource subset value satisfies the allocated rate:

$$R_{n,det}^{coop} = W_n^{coop} \cdot \log_2 \left( 1 + \frac{P_n^{coop} \cdot |\bar{h}_n|^2}{\sigma_0^2} \right).$$

Determine, according to the foregoing steps, that access resources ($P_n^{coop}, W_n^{coop}$) of all the cells for multi-point transmission are the solution of the optimization problem in formula (6).

Based on the foregoing method for determining a multi-point transmission resource, an embodiment of the present disclosure further provides a corresponding apparatus for determining a multi-point transmission resource. The apparatus may be corresponding to the controller in the foregoing method embodiment, may be an independent network element, or may be a base station, a base station controller, or an MME. Referring to FIG. 3, the apparatus includes:

a rate determining module 301, configured to obtain backhaul statuses of multiple cells participating in multi-point transmission, and determine available backhaul rates of the multiple cells according to the backhaul statuses of the multiple cells, where the multiple cells include a primary cell and at least one secondary cell, a backhaul status of the primary cell includes a backhaul status between a gateway and the primary cell, and a backhaul status of the secondary cell includes a backhaul status between the gateway and the secondary cell or a backhaul status between the primary cell and the secondary cell;

a resource obtaining module 302, configured to obtain available access resources of the multiple cells for multi-point transmission; and a processing module 303, configured to determine access resources of the multiple cells for multi-point transmission according to a type and a service requirement of multi-point transmission, and the available backhaul rates and the available access resources of the multiple cells for multi-point transmission.

Further, the rate determining module 301 is specifically configured to:

obtain a maximum backhaul rate of each cell and backhaul load of each cell; and separately calculate an available backhaul rate of each cell according to the maximum backhaul rate and the backhaul load of the cell.

The available access resources of the multiple cells for multi-point transmission include available access bandwidths and available powers.

When a multi-point transmission manner is coordinated transmission, the processing module 303 is configured to:

use a minimum value of the available access bandwidths of the multiple cells as an access bandwidth of the multiple cells for multi-point transmission;

calculate, according to the access bandwidth of the multiple cells for multi-point transmission and an available power of each cell in the multiple cells, a maximum access transmission rate obtained by each cell in the multiple cells when the cell participates in multi-point transmission, and use a minimum value of the maximum access transmission rates of the multiple cells as a maximum access transmission rate of the multiple cells for multi-point transmission;

use a minimum value of the available backhaul rates of the multiple cells as a maximum backhaul rate of the multiple cells;

use a minimum value of a maximum rate required by a multi-point transmission service, the maximum access transmission rate of the multiple cells for multi-point transmission, and the maximum backhaul rate as a coordinated transmission rate; and calculate, according to the coordinated transmission rate and the access bandwidth used for multi-point transmission, an access power of each cell in the multiple cells for participating in multi-point transmission; where the access bandwidth of the multiple cells for multi-point transmission and the access power of each cell for participating in multi-point transmission are the access resources of the multiple cells for multi-point transmission.

When the multi-point transmission manner is cooperative transmission, the processing module is configured to:

calculate, according to an available access bandwidth and an available power of each cell in the multiple cells for participating in multi-point transmission, a maximum access transmission rate obtained by each cell in the multiple cells when the cell participates in multi-point transmission;

use a smaller value of the available backhaul rate and the maximum access transmission rate of each cell in the multiple cells as a cooperative transmission rate of the cell; and determine whether a sum of cooperative transmission rates of the multiple cells satisfies the service requirement of multi-point transmission, and determine an access bandwidth and an access power of each cell according to a determining result and the available access bandwidth and the available power of the cell; where the access bandwidth and the access power of each cell in the multiple cells are the access resources of the multiple cells for participating in multi-point transmission.

Further, the determining whether a sum of cooperative transmission rates of the multiple cells satisfies the service requirement of multi-point transmission, and determining an access bandwidth and an access power of each cell according to a determining result and the available access bandwidth and the available power of the cell includes:

if the sum of the cooperative transmission rates of the multiple cells satisfies the service requirement of multi-point transmission, separately determining the access bandwidth and the access power of each cell, so that they are not greater than the available access bandwidth and the available power of the cell, and a sum of rates of the multiple cells for multi-point transmission satisfies the service requirement of multi-point transmission, where a rate of each cell for multi-point transmission is estimated according to the access bandwidth and the access power of the cell; or if the sum of the cooperative transmission rates of the multiple cells cannot satisfy the service requirement of multi-point transmission, using, by each cell, the corresponding available access bandwidth and available power for participating in multi-point transmission as the access bandwidth and the access power of the cell.

Optionally, the apparatus may further include a resource allocation module, configured to assign the access resource used for multi-point transmission for the multiple cells.

The apparatus is corresponding to the foregoing method embodiment, all other corresponding steps in the method embodiment may be performed by the foregoing corresponding modules, and details are not described herein.

Figure 4:
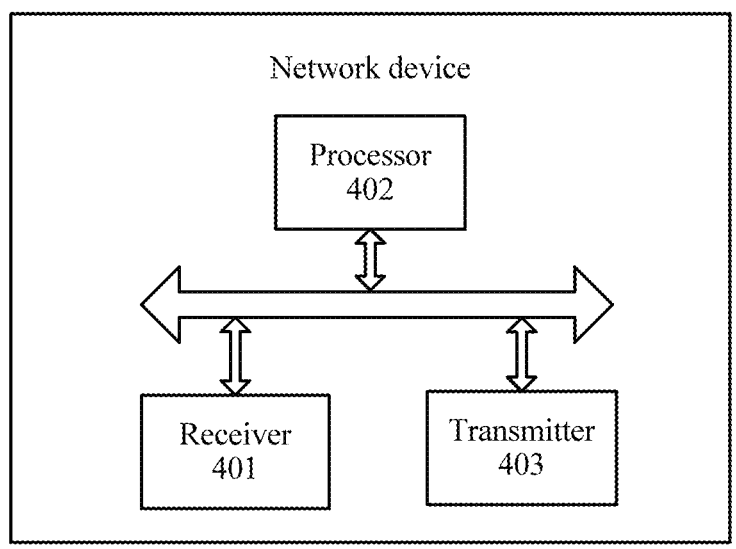
FIG. 4 is a schematic structural diagram of an apparatus for determining a multi-point transmission resource according to another embodiment of the present disclosure.

In addition, an embodiment of the present disclosure further provides a wireless network device. Referring to FIG. 4, the device includes a processor 402 and a receiver 401. Optionally, the device further includes a transmitter 403. The device may be corresponding to the controller in the foregoing method embodiment, may be an independent network element, or may be a base station, a base station controller, or an MME, and implements corresponding functions in the method embodiment. The device is similar to the apparatus for determining a multi-point transmission resource of the embodiment in FIG. 3.

The receiver 401 is configured to obtain backhaul statuses of multiple cells participating in multi-point transmission, and determine available backhaul rates of the multiple cells according to the backhaul statuses of the multiple cells, where the multiple cells include a primary cell and at least one secondary cell, a backhaul status of the primary cell includes a backhaul status between a gateway and the primary cell, and a backhaul status of the secondary cell includes a backhaul status between the gateway and the secondary cell or a backhaul status between the primary cell and the secondary cell; and is further configured to obtain available access resources of the multiple cells for multi-point transmission; and the processor 402 is configured to determine access resources of the multiple cells for multi-point transmission according to a type and a service requirement of multi-point transmission, and the available backhaul rates and the available access resources of the multiple cells for multi-point transmission.

In addition, there are various implementations, which are not limited to the foregoing implementations. For example, the receiver 401 may implement corresponding functions of the rate determining module 301 and the resource obtaining module 302 in FIG. 3, the processor 402 may implement a corresponding function of the processing module 303, and details are not described herein. Alternatively, in another embodiment, the receiver 401 performs a related process of steps such as receiving and obtaining in the method embodiment, and the processor 402 implements a related process of steps such as determining and calculating in the method embodiment. Further, a related process of steps such as transmitting and allocating in the method embodiment may be performed by the transmitter 403.

According to the method and the apparatus for determining a multi-point transmission resource provided in the present disclosure, after backhaul statuses and available access resources of multiple cells participating in multi-point transmission are obtained, access resources of the multiple cells for multi-point transmission are determined with reference to a type of multi-point transmission. While a service requirement is satisfied, the access resource is properly allocated, and multi-point transmission efficiency is improved.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for determining a multi-point transmission resource, the method comprising:
    obtaining backhaul statuses of multiple cells participating in multi-point transmission;
    determining available backhaul rates of the multiple cells according to the backhaul statuses of the multiple cells, wherein the multiple cells comprise a primary cell and at least one secondary cell, a backhaul status of the primary cell comprises a backhaul status between a gateway and the primary cell, and a backhaul status of the secondary cell comprises a backhaul status between the gateway and the secondary cell or a backhaul status between the primary cell and the secondary cell;
    obtaining available access resources of the multiple cells for multi-point transmission; and
    determining access resources of the multiple cells for multi-point transmission according to a type and a service requirement of multi-point transmission and the available backhaul rates and the available access resources of the multiple cells for multi-point transmission.

2. The method according to claim 1, wherein obtaining backhaul statuses of multiple cells participating in multi-point transmission, and determining available backhaul rates of the multiple cells according to the backhaul statuses of the multiple cells comprises:

obtaining a maximum backhaul rate of each cell and backhaul load of each cell; and separately calculating an available backhaul rate of each cell according to the maximum backhaul rate and the backhaul load of the cell.

3. The method according to claim 1, wherein the available access resources of the multiple cells for multi-point transmission comprise available access bandwidths and available powers.

4. The method according to claim 3, wherein when a type of multi-point transmission is coordinated transmission, determining access resources of the multiple cells for multi-point transmission according to a service requirement of multi-point transmission and the available backhaul rates and the available access resources of the multiple cells for multi-point transmission comprises:

using a minimum value of the available access bandwidths of the multiple cells as an access bandwidth of the multiple cells for multi-point transmission;

calculating, according to the access bandwidth of the multiple cells for multi-point transmission and an available power of each cell in the multiple cells, a maximum access transmission rate obtained by each cell in the multiple cells when the cell participates in multi-point transmission, and using a minimum value of the maximum access transmission rates of the multiple cells as a maximum access transmission rate of the multiple cells for multi-point transmission;

using a minimum value of the available backhaul rates of the multiple cells as a maximum backhaul rate of the multiple cells;

using a minimum value of a maximum rate required by a multi-point transmission service, the maximum access transmission rate of the multiple cells for multi-point transmission, and the maximum backhaul rate as a coordinated transmission rate;

calculating, according to the coordinated transmission rate and the access bandwidth used for multi-point transmission, an access power of each cell in the multiple cells for participating in multi-point transmission; and wherein the access bandwidth of the multiple cells for multi-point transmission and the access power of each cell for participating in multi-point transmission are the access resources of the multiple cells for multi-point transmission.

5. The method according to claim 3, wherein when a type of multi-point transmission is cooperative transmission, determining access resources of the multiple cells for multi-point transmission according to a service requirement of multi-point transmission and the available backhaul rates and the available access resources of the multiple cells for multi-point transmission comprises:

calculating, according to an available access bandwidth and an available power of each cell in the multiple cells for participating in multi-point transmission, a maximum access transmission rate obtained by each cell in the multiple cells when the cell participates in multi-point transmission;

using a smaller value of the available backhaul rate and the maximum access transmission rate of each cell in the multiple cells as a cooperative transmission rate of the cell; and determining whether a sum of cooperative transmission rates of the multiple cells satisfies the service requirement of multi-point transmission, and determining an access bandwidth and an access power of each cell according to a determining result and the available access bandwidth and the available power of the cell; and wherein the access bandwidth and the access power of each cell in the multiple cells are the access resources of the multiple cells for participating in multi-point transmission.

6. The method according to claim 5, wherein determining whether a sum of cooperative transmission rates of the multiple cells satisfies the service requirement of multi-point transmission, and determining an access bandwidth and an access power of each cell according to a determining result and the available access bandwidth and the available power of the cell comprises at least one of:

when the sum of the cooperative transmission rates of the multiple cells satisfies the service requirement of multi-point transmission, separately determining the access bandwidth and the access power of each cell, so that they are not greater than the available access bandwidth and the available power of the cell, and a sum of rates of the multiple cells for multi-point transmission satisfies the service requirement of multi-point transmission, wherein a rate of each cell for multi-point transmission is estimated according to the access bandwidth and the access power of the cell; or when the sum of the cooperative transmission rates of the multiple cells cannot satisfy the service requirement of multi-point transmission, using, by each cell, the corresponding available access bandwidth and available power for participating in multi-point transmission as the access bandwidth and the access power of the cell.

7. An apparatus for determining a multi-point transmission resource, the apparatus comprising:

a processor, configured to:

obtain backhaul statuses of multiple cells participating in multi-point transmission, determine available backhaul rates of the multiple cells according to the backhaul statuses of the multiple cells, wherein the multiple cells comprise a primary cell and at least one secondary cell, a backhaul status of the primary cell comprises a backhaul status between a gateway and the primary cell, and a backhaul status of the secondary cell comprises a backhaul status between the gateway and the secondary cell or a backhaul status between the primary cell and the secondary cell, obtain available access resources of the multiple cells for multi-point transmission, and determine access resources of the multiple cells for multi-point transmission according to a type and a service requirement of multi-point transmission, and the available backhaul rates and the available access resources of the multiple cells for multi-point transmission.

8. The apparatus according to claim 7, wherein the processor is configured to:

obtain a maximum backhaul rate of each cell and backhaul load of each cell; and separately calculate an available backhaul rate of each cell according to the maximum backhaul rate and the backhaul load of the cell.

9. The apparatus according to claim 7, wherein the available access resources of the multiple cells for multi-point transmission comprise available access bandwidths and available powers.

10. The apparatus according to claim 9, wherein when a type of multi-point transmission is coordinated transmission, the processor is configured to:

use a minimum value of the available access bandwidths of the multiple cells as an access bandwidth of the multiple cells for multi-point transmission;

calculate, according to the access bandwidth of the multiple cells for multi-point transmission and an available power of each cell in the multiple cells, a maximum access transmission rate obtained by each cell in the multiple cells when the cell participates in multi-point transmission, and use a minimum value of the maximum access transmission rates of the multiple cells as a maximum access transmission rate of the multiple cells for multi-point transmission;

use a minimum value of the available backhaul rates of the multiple cells as a maximum backhaul rate of the multiple cells;

use a minimum value of a maximum rate required by a multi-point transmission service, the maximum access transmission rate of the multiple cells for multi-point transmission, and the maximum backhaul rate as a coordinated transmission rate;

calculate, according to the coordinated transmission rate and the access bandwidth used for multi-point transmission, an access power of each cell in the multiple cells for participating in multi-point transmission; and wherein the access bandwidth of the multiple cells for multi-point transmission and the access power of each cell for participating in multi-point transmission are the access resources of the multiple cells for multi-point transmission.

11. The apparatus according to claim 9, wherein when a type of multi-point transmission is cooperative transmission, the processor is configured to:

calculate, according to an available access bandwidth and an available power of each cell in the multiple cells for participating in multi-point transmission, a maximum access transmission rate obtained by each cell in the multiple cells when the cell participates in multi-point transmission;

use a smaller value of the available backhaul rate and the maximum access transmission rate of each cell in the multiple cells as a cooperative transmission rate of the cell;

determine whether a sum of cooperative transmission rates of the multiple cells satisfies the service requirement of multi-point transmission, and determine an access bandwidth and an access power of each cell according to a determining result and the available access bandwidth and the available power of the cell; and wherein the access bandwidth and the access power of each cell in the multiple cells are the access resources of the multiple cells for participating in multi-point transmission.

12. The apparatus according to claim 11, wherein to determine whether a sum of cooperative transmission rates of the multiple cells satisfies the service requirement of multi-point transmission and determine an access bandwidth and an access power of each cell according to a determining result and the available access bandwidth and the available power of the cell, the processor is configured to:

when the sum of the cooperative transmission rates of the multiple cells satisfies the service requirement of multi-point transmission, separately determining the access bandwidth and the access power of each cell, so that they are not greater than the available access bandwidth and the available power of the cell, and a sum of rates of the multiple cells for multi-point transmission satisfies the service requirement of multi-point transmission, wherein a rate of each cell for multi-point transmission is estimated according to the access bandwidth and the access power of the cell; and when the sum of the cooperative transmission rates of the multiple cells cannot satisfy the service requirement of multi-point transmission, using, by each cell, the corresponding available access bandwidth and available power for participating in multi-point transmission as the access bandwidth and the access power of the cell.

* * * * *